(No Model.)

H. DICKSON.

MANUFACTURE OF BRICK, TILE, DRAIN PIPES, &c.

No. 346,358. Patented July 27, 1886.

WITNESSES:
Fred. G. Dieterich
Wm. E. Dyre

INVENTOR
Henry Dickson
By Johnston, Reinohl & Dyre
ATTORNEY

United States Patent Office.

HENRY DICKSON, OF PITTSBURG, PENNSYLVANIA, ASSIGNOR TO SUSAN CATHERINE DICKSON, OF SAME PLACE.

MANUFACTURE OF BRICK, TILE, DRAIN-PIPES, &c.

SPECIFICATION forming part of Letters Patent No. 346,358, dated July 27, 1886.

Application filed January 19, 1886. Serial No. 189,103. (No model.)

*To all whom it may concern:*

Be it known that I, HENRY DICKSON, a citizen of the United States, residing at Pittsburg, in the county of Allegheny and State of Pennsylvania, have invented certain new and useful Improvements in the Manufacture of Brick, Tile, Drain-Pipes, &c.; and I do hereby declare the following to be a full, clear, and exact description of the invention, such as will enable others skilled in the art to which it appertains to make and use the same.

This invention relates to an improvement on my Patent No. 313,480, granted March 10, 1885; and it consists in forming a compound of slate and aluminous clay, in the proportions hereinafter specified, for the purpose of manufacturing brick, tile, drain-pipe, and kindred articles.

It is a fact well known that in connection with slate-quarries there is a vast amount of waste or refuse matter in the form of small pieces of slate, and that it becomes a source of serious annoyance by its accumulation. It has been discovered that this waste can be utilized very profitably by converting it into brick for building and other purposes, tile for flooring, drain-pipe for ordinary uses, and various other articles of commerce may be made from it, and that articles made therefrom possess a finer grain, are superior in quality, and more durable than those now in common use made from other analogous material.

In the art of manufacturing brick, &c., under my patent above referred to considerable loss has been sustained by the manufacturer by the breaking of green brick and other articles made from slate alone, and in order to prevent the breaking of said brick great care must be exercised in handling them, which results in loss of time, increased expense, and renders the making of molded articles therefrom unprofitable.

The object of my present invention is to overcome the difficulty referred to, and it is accomplished by the means hereinafter described.

Figure 1:
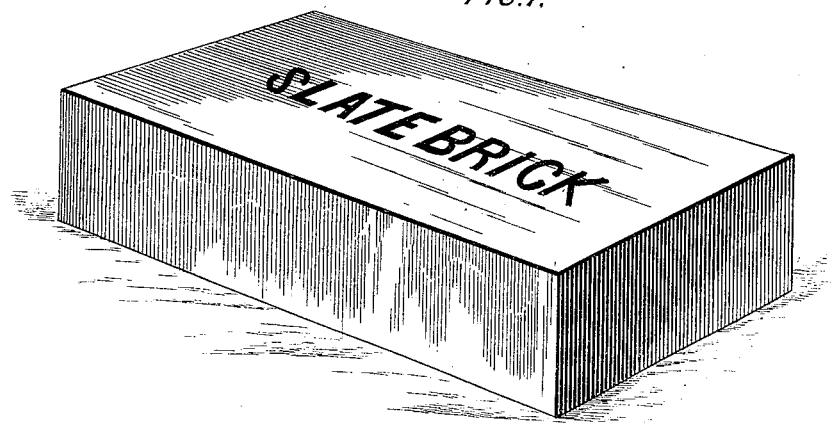
Figure 2:
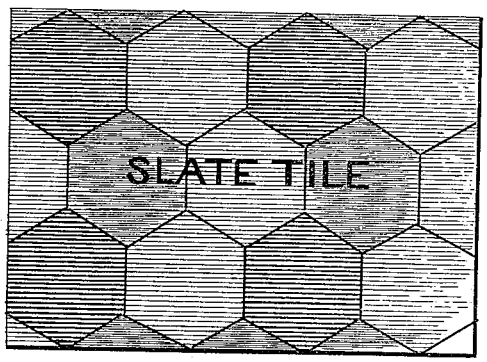
Figure 3:
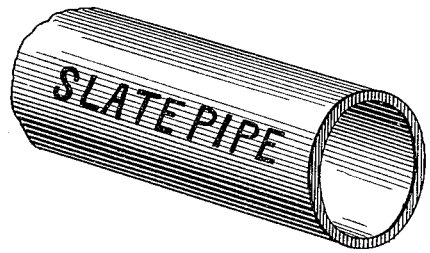

In the accompanying drawings, Figure 1 represents a brick; Fig. 2, a section of tile floor, and Fig. 3 a section of pipe made from slate and aluminous clay in accordance with my invention.

Under my original process of manufacturing brick, tile, drain-pipes, &c., as set forth in my patent, the waste of slate-quarries was pulverized, tempered, and molded into various forms; but owing to the brittleness and lack of adhesiveness possessed by the slate a large number of the molded articles while in their green state were broken by handling them in drying on floors, racking, and setting them in kilns.

By a series of experiments I have discovered that by mixing aluminous clay with the slate this defect can be overcome and a very superior quality of brick, tile, or drain-pipe produced.

In practicing my invention I take the ordinary waste of the slate-quarry, pulverize it by ordinary means, then mix with it aluminous clay in the proportion of about four parts slate to one part of clay, or five parts slate to one part of clay, according to the richness or adhesive quality of the clay. I then temper the compound in the ordinary manner well known to the art, mold it into form, and dry the articles, after which they are burned in an oven or kiln, as usual.

Articles made from slate and clay in about the proportions set forth can be handled with equal facility as such as are made wholly of clay, and render it practicable to manufacture a very superior article from a substance which has heretofore been permitted not only to go to waste, but to prove a great obstacle to the working of slate-quarries, or it subjected the persons engaged in working the quarries to a heavy expense to remove the refuse matter, without yielding any remuneration for the labor and expense incurred.

By the use of slate of different colors—such as black, blue, red, and gray—for the manufacture of tiling a very fine appearance may be given to a floor, while it possesses a finer grain and presents a smoother surface than that made from clay alone, and at a greatly-reduced cost, while its durability is greatly increased; and the same effect may be produced by using brick of different colors for ornamenting the fronts of buildings.

Having thus fully described my invention, what I claim is—

1. A brick, tile, pipe, or other molded article made of a compound of pulverized slate and aluminous clay, substantially as described.

2. A brick, tile, pipe, or other molded article made of a compound of pulverized slate and aluminous clay in the proportion of about four or five parts slate and one part clay, substantially as described.

3. The process of treating slate for the manufacture of brick, tile, pipe, or other molded articles, which consists in pulverizing the slate, mixing therewith a quantity of aluminous clay, tempering the compound, molding it into articles of commerce, drying them, and finally baking or burning said articles, substantially as described.

In testimony whereof I affix my signature in presence of two witnesses.

HENRY DICKSON.

Witnesses:
JAMES J. JOHNSTON,
JAMES J. JOHNSTON, Jr.